US007625159B1

(12) United States Patent
Sanchez

(10) Patent No.: US 7,625,159 B1
(45) Date of Patent: Dec. 1, 2009

(54) PIPE FERRULE REMOVAL TOOL APPARATUS

(76) Inventor: Joseph D. Sanchez, 27026 Pacific Terrace Dr., Mission Viejo, CA (US) 92692

( * ) Notice: Subject to any disclaimer, the term of this patent is extended or adjusted under 35 U.S.C. 154(b) by 152 days.

(21) Appl. No.: 11/850,732

(22) Filed: Sep. 6, 2007

(51) Int. Cl.
B23B 47/28 (2006.01)
(52) U.S. Cl. ................... 408/97; 408/110; 408/112
(58) Field of Classification Search ........... 408/72 R, 408/84, 87, 95, 97, 103, 110–112, 115 R, 408/115 B, 72 B
See application file for complete search history.

(56) References Cited

U.S. PATENT DOCUMENTS

| 2,976,748 | A | * | 3/1961 | Quick et al. ................. 408/97 |
| 3,083,593 | A | * | 4/1963 | Cutter ..................... 408/241 R |
| 3,154,842 | A | | 11/1964 | Reel |
| 3,579,796 | A | | 5/1971 | Fillion |
| 3,620,635 | A | * | 11/1971 | DalBianco et al. ............ 408/84 |
| 3,677,655 | A | * | 7/1972 | Ratteree et al. ............. 408/1 R |
| 3,708,855 | A | | 1/1973 | Whiteside et al. |
| 3,743,433 | A | * | 7/1973 | Smith ..................... 408/72 R |
| 3,907,452 | A | * | 9/1975 | Tripp ....................... 408/56 |
| 4,027,992 | A | * | 6/1977 | Mackey et al. ............... 408/97 |
| 4,375,341 | A | * | 3/1983 | Schulze .................... 408/72 R |
| 4,516,598 | A | * | 5/1985 | Stupak ..................... 137/318 |
| 4,865,496 | A | * | 9/1989 | Challis .................... 408/115 R |
| 5,076,742 | A | * | 12/1991 | Lee et al. ................... 408/112 |
| 5,152,310 | A | * | 10/1992 | O'Bryon .................. 137/15.08 |
| 5,519,929 | A | | 5/1996 | Bleckman |
| D506,115 | S | | 6/2005 | King |
| 6,904,660 | B2 | | 6/2005 | English |
| 7,435,041 | B1 | * | 10/2008 | McGill ...................... 408/92 |

* cited by examiner

Primary Examiner—Daniel W Howell

(57) ABSTRACT

A pipe ferrule removal tool apparatus includes a housing that has a top side, a bottom side and a perimeter wall extending between the top and bottom sides. The top side has an opening extending therein and outwardly of the bottom side. A receiving aperture extends into the perimeter wall and intersects the opening. A pipe is extendable into the receiving aperture and a ferrule positioned on the pipe is alignable with the opening. A cutting member is mounted in the opening. The cutting member includes an elongated rod with a top end and a bottom end. The bottom end comprises a bit abutted against the ferrule when the pipe is positioned in the receiving aperture. The top end extends upwardly out of the top side. A drill is engaged with the top end of the rod and turned on to rotate the rod and cut the ferrule.

13 Claims, 7 Drawing Sheets

PIPE FERRULE REMOVAL TOOL APPARATUS

BACKGROUND OF THE INVENTION

1. Field of the Invention

The present invention relates to ferrule removal devices and more particularly pertains to a new ferrule removal device for assisting a person in cutting, and thereby allow the removal of, a ferrule from a pipe.

2. Summary of the Invention

The present invention presented above generally comprises a housing that has a top side, a bottom side and a perimeter wall extending between the top and bottom sides. The top side has an opening extending therein and outwardly of the bottom side. A receiving aperture extends into the perimeter wall. The receiving aperture extends through the housing. The receiving aperture intersects and is oriented approximately perpendicular to the opening. A pipe is extendable into the receiving aperture and a ferrule positioned on the pipe is alignable with the opening. A cutting member is mounted in the opening and is positionable in the aperture. The cutting member includes an elongated rod that has a top end and a bottom end. The bottom end comprises a bit. The top end extends upwardly out of the top side. The bit is abutted against the ferrule when the pipe is positioned in the receiving aperture. A drill is engaged with the top end of the rod and turned on to rotate the rod and cut the ferrule.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
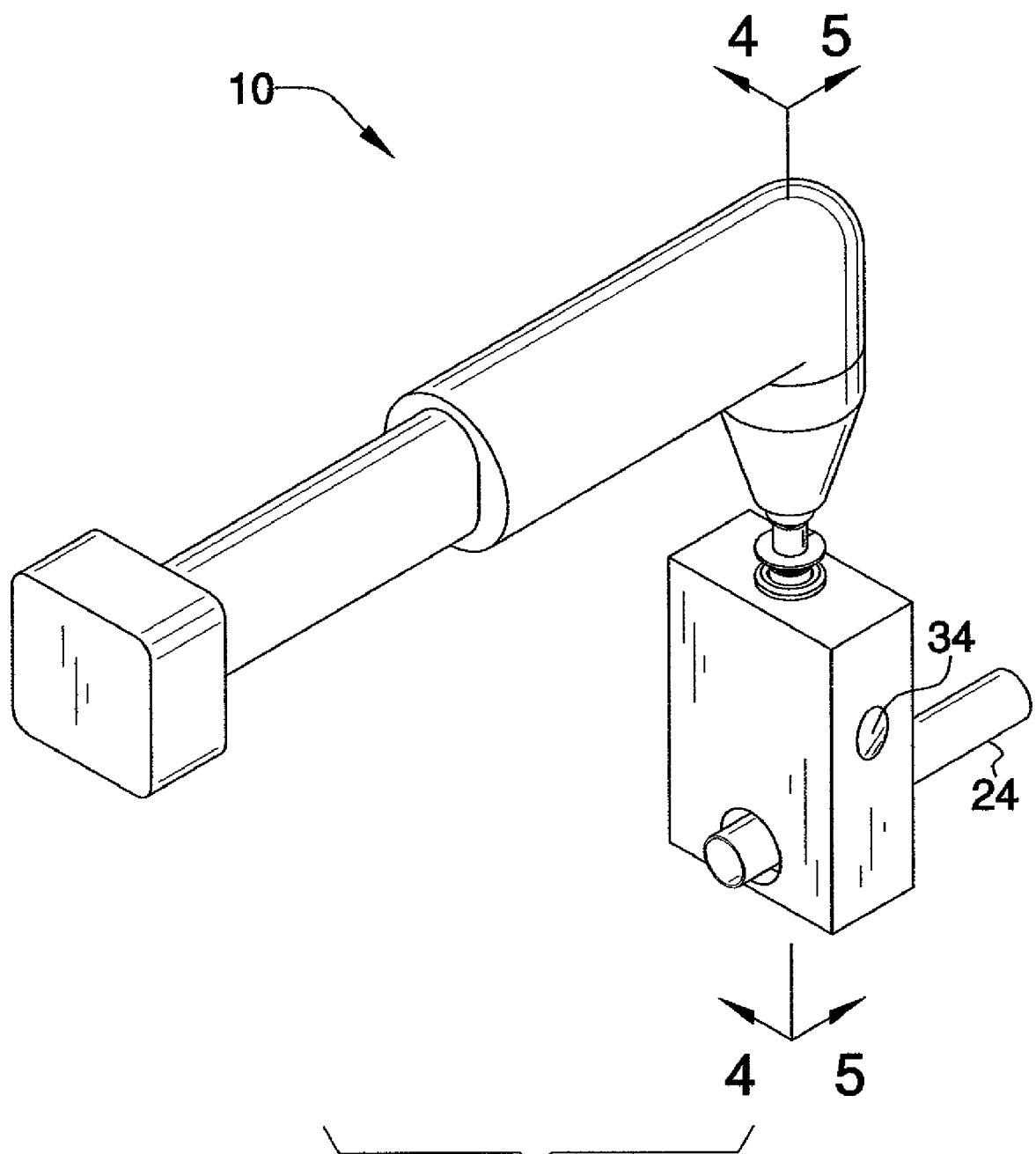
FIG. 1 is a perspective in-use view of a pipe ferrule removal tool apparatus according to the present invention.
Figure 2:
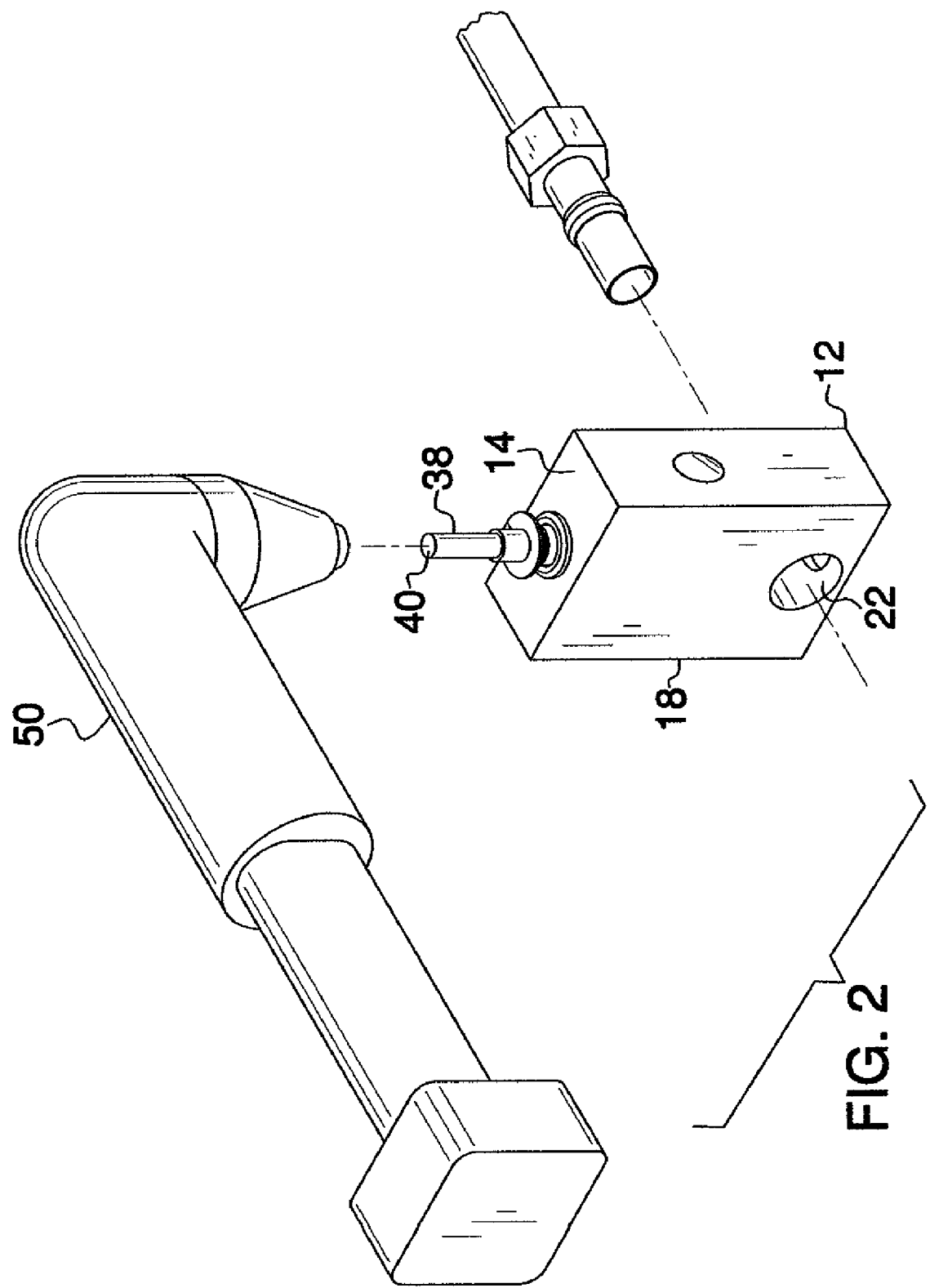
FIG. 2 is a perspective in-use view of the present invention.
Figure 3:
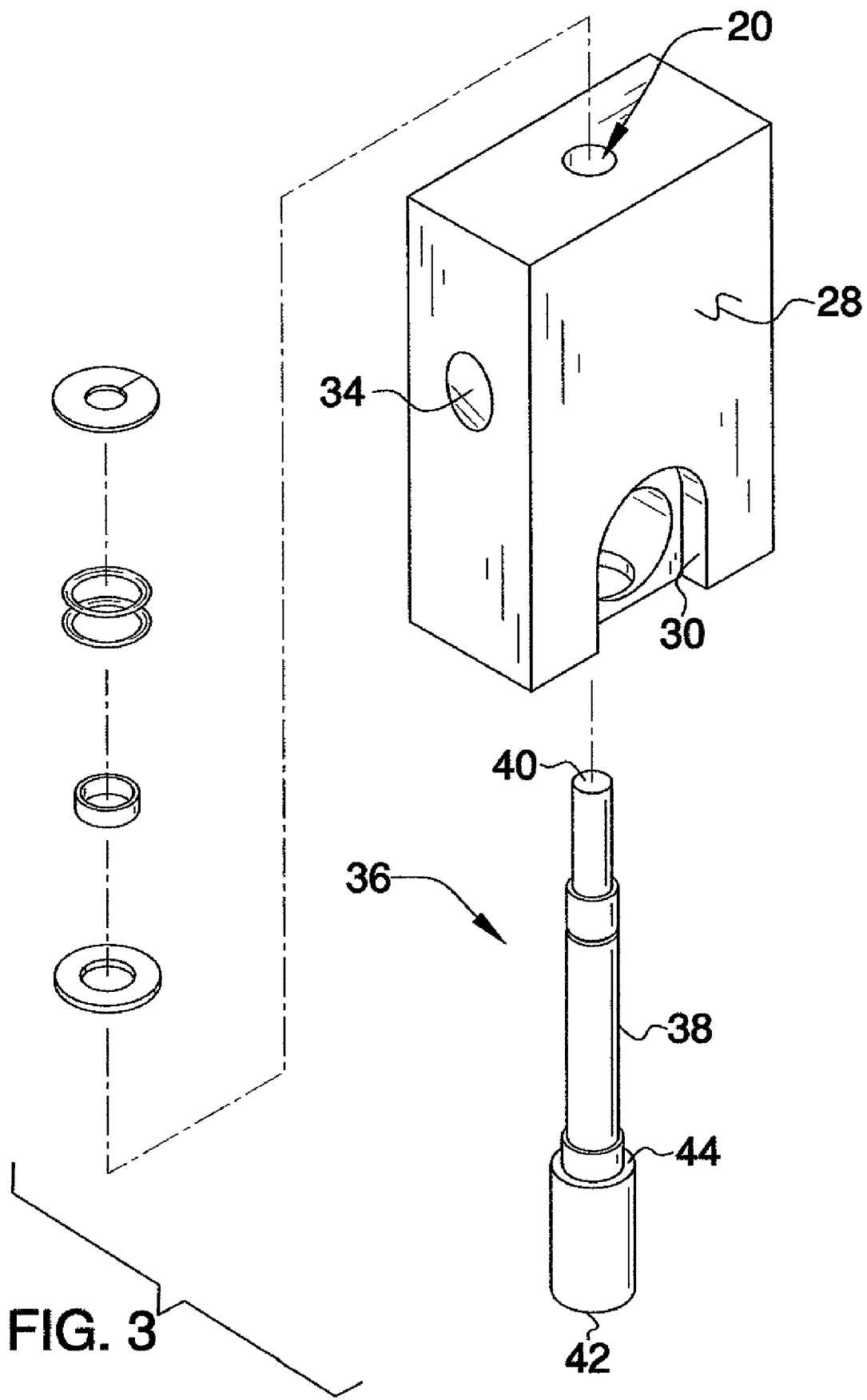
FIG. 3 is an expanded view of the present invention.
Figure 4:
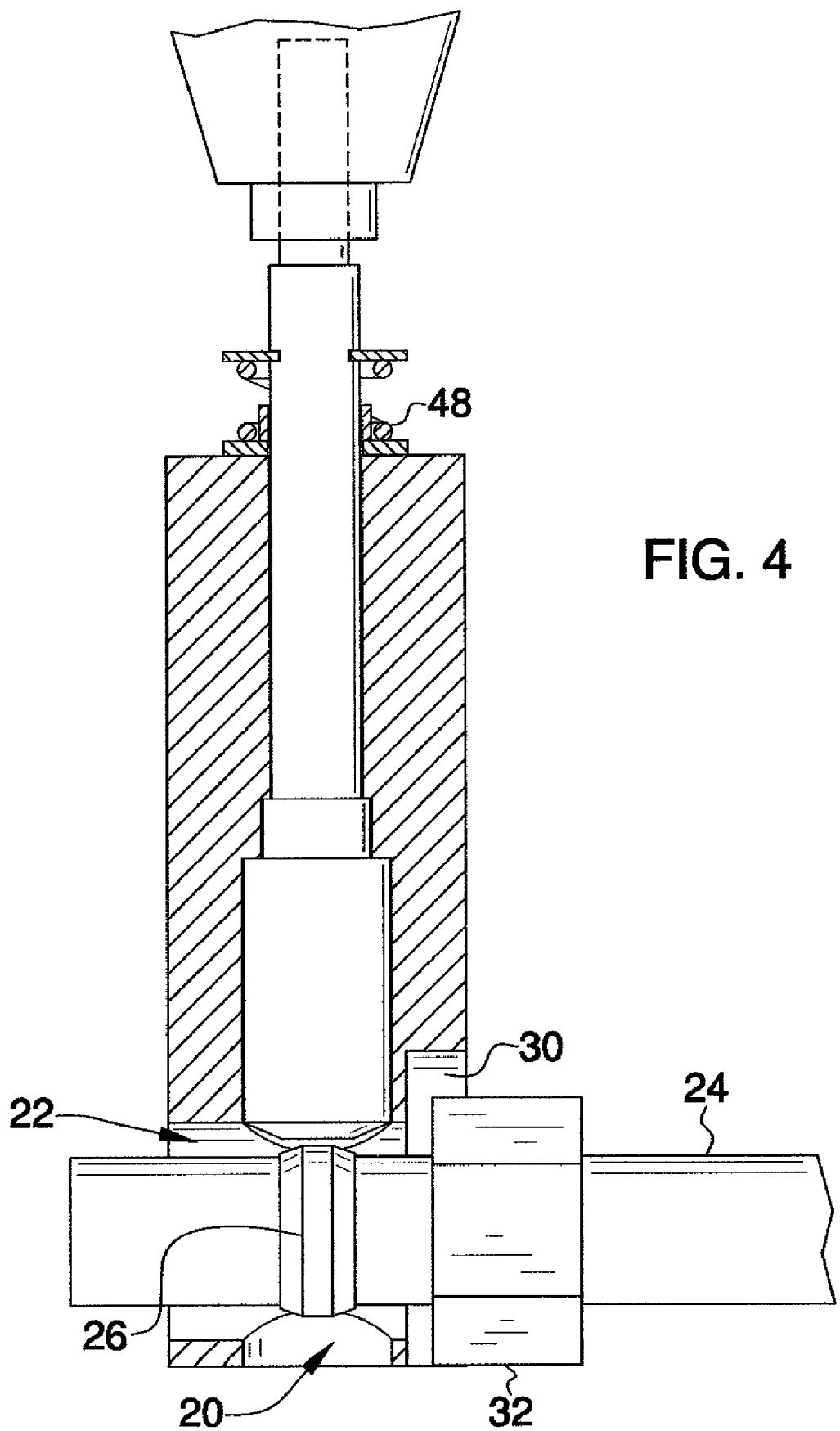
FIG. 4 is a cross-sectional view taken along line 4-4 of FIG. 1 of the present invention.
Figure 5:
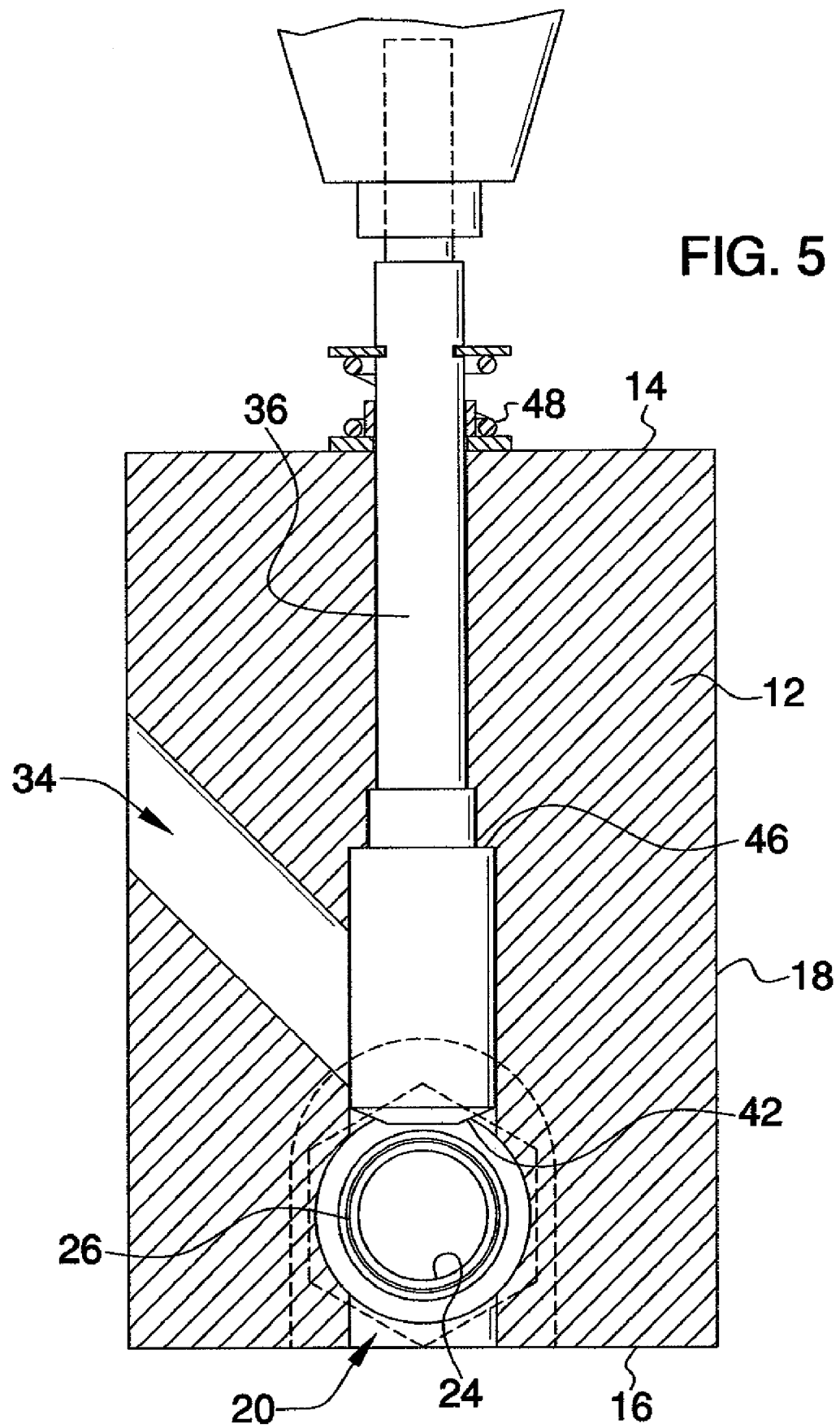
FIG. 5 is a cross-sectional view taken along line 5-5 of FIG. 1 of the present invention.
Figure 6:
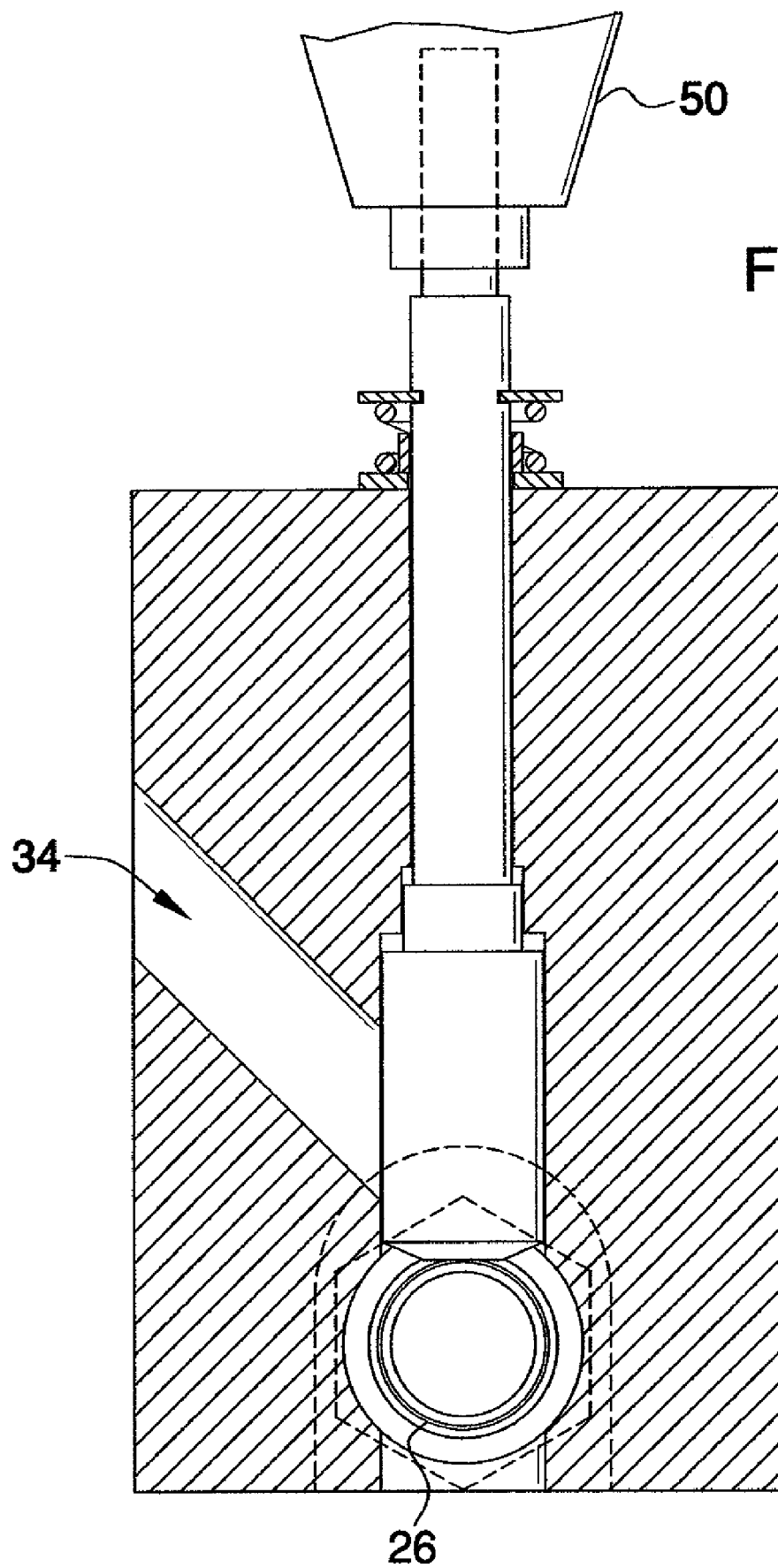
FIG. 6 is a cross-sectional view of the present invention showing a ferrule being cut.
Figure 7:
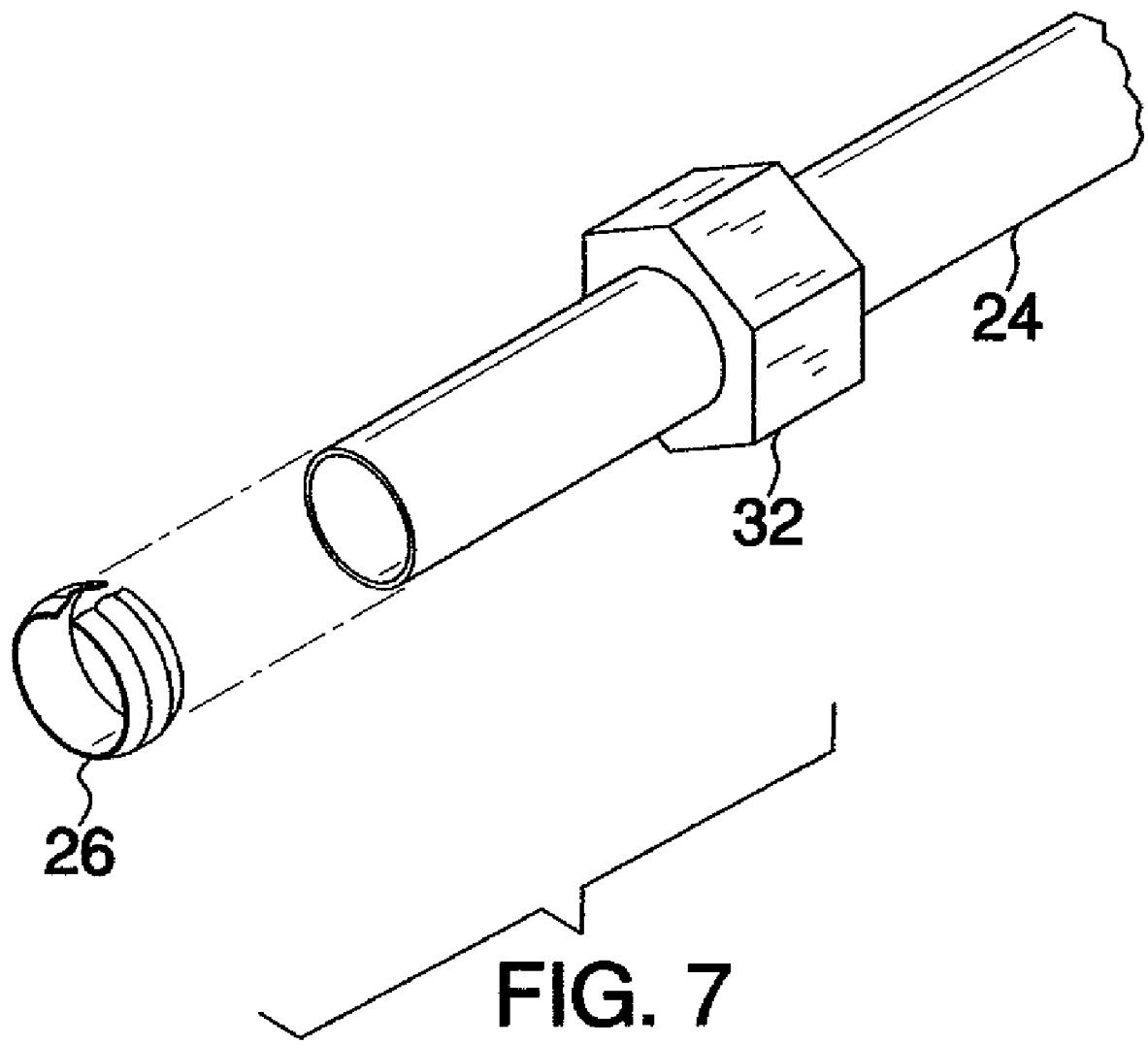
FIG. 7 is a perspective view of a pipe and ferrule of the present invention.

With reference now to the drawings, and in particular to FIGS. 1 through 7 thereof, a new ferrule removal device embodying the principles and concepts of the present invention and generally designated by the reference numeral 10 will be described.

As best illustrated in FIGS. 1 through 7, the pipe ferrule removal tool apparatus 10 generally comprises a housing 12 has a top side 14, a bottom side 16 and a perimeter wall 18 extending between the top 14 and bottom 16 sides. The top side 14 has an opening 20 extending therein and outwardly of the bottom side 16. A receiving aperture 22 extends into the perimeter wall 18 and extends through the housing 12 such that it extends into one side of the housing 12 and outwardly out of another side of the housing 12. The receiving aperture 22 intersects and is oriented approximately perpendicular to the opening 20. The receiving aperture 22 is positioned nearer to the bottom side 16 than the top side 14. A pipe 24 is extendable into the receiving aperture 22 and a ferrule 26 positioned on the pipe 24 is alignable with the opening 20. The peripheral wall 18 has an outer surface 28 having a recess 30 therein. The recess 30 extends upwardly through the bottom side 16. A nut 32 positioned on the pipe 24 may be positioned in the recess 30 to allow the ferrule 26 to be aligned with the opening 20.

The peripheral wall 18 has a viewing hole 34 extending therein. The viewing hole 34 extends into a juncture of the receiving aperture 22 and the opening 20. The viewing hole 34 is orientated approximately perpendicular to the receiving aperture 22. The viewing hole 34 and the opening 20 form an angle between 30 degrees and 60 degrees.

A cutting member 36 is mounted in the opening 20 and is positionable in the aperture 22. The cutting member 20 includes an elongated rod 38 that has a top end 40 and a bottom end 42. The bottom end 42 comprises a bit. The top end 40 extends upwardly out of the top side 14. The bit, or bottom end 42, is abutted against the ferrule 26 when the pipe 24 is positioned in the receiving aperture 22. The rod 38 has a perimeter flange 44 positioned between the top 40 and bottom 42 ends and is abuttable against a shoulder 46 positioned in the opening 20. The flange 44 prevents upwardly movement of the rod 38 in opening 20.

A biasing member 48 is attached to the rod 38 between the top end 40 of the rod 38 and the top side 14 of the housing 12. The biasing member 48 biases the bit 42 outwardly of the receiving aperture 22 and away from the bottom side 16.

In use, the ferrule 26 is positioned within the housing 12 as described above and as shown in FIG. 5. A conventional electric drill 50 is engaged with the top end 40 of the rod 38. The drill 50 is turned on to rotate the rod 38 and cut the ferrule 26. Once cut, the ferrule 26 can be pried easily from the pipe 24.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool apparatus for removing a ferrule from a pipe, said apparatus comprising:

a housing having a top side, a bottom side and a perimeter wall extending between said top and bottom sides, said top side having an opening extending therein and outwardly of said bottom side, a receiving aperture extending into said perimeter wall, said receiving aperture extending through said housing, said receiving aperture intersecting and being oriented approximately perpendicular to said opening, wherein a pipe is extendable into said receiving aperture and a ferrule positioned on said pipe is alignable with said opening;

a cutting member being mounted in said opening and being positionable in said aperture, said cutting member including an elongated rod having a top end and a bottom end, said bottom end comprising a bit, said top end extending upwardly out of said top side, said bit being abutted against the ferrule when the pipe is positioned in said receiving aperture;

said receiving aperture being positioned nearer to said bottom side than said top side;

said peripheral wall having an outer surface having a recess therein, said recess extending upwardly through said bottom side, wherein a nut positioned on said pipe may be positioned in said recess to allow the ferrule to be aligned with said opening; and wherein a drill is engaged with said top end of said rod and turned on to rotate said rod and cut said ferrule.

2. The apparatus according to claim 1, wherein said peripheral wall has a viewing hole extending therein, said viewing hole extending into a juncture of said receiving aperture and said opening.

3. The apparatus according to claim 2, wherein said viewing hole is orientated approximately perpendicular to said receiving aperture.

4. The apparatus according to claim 3, wherein said viewing hole and said opening form an angle between 30 degrees and 60 degrees.

5. The apparatus according to claim 1, wherein said rod has a perimeter flange positioned between said top and bottom ends, said flange being abuttable against a shoulder positioned in said opening, said flange preventing upwardly movement of said rod in opening.

6. The apparatus according to claim 5, further including a biasing member being attached to said rod between said top end of said rod and said top side of said housing, said biasing member biasing said bit outwardly of said receiving aperture and away from said bottom side.

7. A tool apparatus for removing a ferrule from a pipe, said apparatus comprising:

a housing having a top side, a bottom side and a perimeter wall extending between said top and bottom sides, said top side having an opening extending therein and outwardly of said bottom side, a receiving aperture extending into said perimeter wall, said receiving aperture extending through said housing, said receiving aperture intersecting and being oriented approximately perpendicular to said opening, said receiving aperture being positioned nearer to said bottom side than said top side, wherein a pipe is extendable into said receiving aperture and a ferrule positioned on said pipe is alignable with said opening, said peripheral wall having an outer surface having a recess therein, said recess extending upwardly through said bottom side, wherein a nut positioned on said pipe may be positioned in said recess to allow the ferrule to be aligned with said opening;

said peripheral wall having a viewing hole extending therein, said viewing hole extending into a juncture of said receiving aperture and said opening, said viewing hole being orientated approximately perpendicular to said receiving aperture, said viewing hole and said opening forming an angle between 30 degrees and 60 degrees;

a cutting member being mounted in said opening and being positionable in said aperture, said cutting member including an elongated rod having a top end and a bottom end, said bottom end comprising a bit, said top end extending upwardly out of said top side, said bit being abutted against the ferrule when the pipe is positioned in said receiving aperture, said rod having a perimeter flange positioned between said top and bottom ends, said flange being abuttable against a shoulder positioned in said opening, said flange preventing upwardly movement of said rod in opening;

a biasing member being attached to said rod between said top end of said rod and said top side of said housing, said biasing member biasing said bit outwardly of said receiving aperture and away from said bottom side; and wherein a drill is engaged with said top end of said rod and turned on to rotate said rod and cut said ferrule.

8. A tool apparatus for removing a ferrule from a pipe, said apparatus comprising:

a housing having a top side, a bottom side and a perimeter wall extending between said top and bottom sides, said top side having an opening extending therein and outwardly of said bottom side, a receiving aperture extending into said perimeter wall, said receiving aperture extending through said housing, said receiving aperture intersecting and being oriented approximately perpendicular to said opening, wherein a pipe is extendable into said receiving aperture and a ferrule positioned on said pipe is alignable with said opening;

a cutting member being mounted in said opening and being positionable in said aperture, said cutting member including an elongated rod having a top end and a bottom end, said bottom end comprising a bit, said top end extending upwardly out of said top side, said bit being abutted against the ferrule when the pipe is positioned in said receiving aperture;

said peripheral wall having a viewing hole extending therein, said viewing hole extending into a juncture of said receiving aperture and said opening; and wherein a drill is engaged with said top end of said rod and turned on to rotate said rod and cut said ferrule.

9. The apparatus according to claim 8, wherein said receiving aperture is positioned nearer to said bottom side than said top side.

10. The apparatus according to claim 8, wherein said viewing hole is orientated approximately perpendicular to said receiving aperture.

11. The apparatus according to claim 10, wherein said viewing hole and said opening form an angle between 30 degrees and 60 degrees.

12. The apparatus according to claim 8, wherein said rod has a perimeter flange positioned between said top and bottom ends, said flange being abuttable against a shoulder positioned in said opening, said flange preventing upwardly movement of said rod in opening.

13. The apparatus according to claim 12, further including a biasing member being attached to said rod between said top end of said rod and said top side of said housing, said biasing member biasing said bit outwardly of said receiving aperture and away from said bottom side.

* * * * *